United States Patent
Koopmans et al.

(10) Patent No.: US 8,192,069 B2
(45) Date of Patent: *Jun. 5, 2012

(54) WATER SUPPLY MIXING PROCESS

(76) Inventors: Richard J. Koopmans, Oroville, WA (US); Kristinn G. Drewry, Oroville, WA (US)

( * ) Notice: Subject to any disclaimer, the term of this patent is extended or adjusted under 35 U.S.C. 154(b) by 693 days.

This patent is subject to a terminal disclaimer.

(21) Appl. No.: 12/290,661

(22) Filed: Oct. 31, 2008

(65) Prior Publication Data

US 2009/0279380 A1  Nov. 12, 2009

Related U.S. Application Data

(60) Provisional application No. 61/127,376, filed on May 12, 2008.

(51) Int. Cl.
B01F 3/04 (2006.01)
B01F 13/02 (2006.01)

(52) U.S. Cl. .................. 366/101; 366/142; 366/151.1

(58) Field of Classification Search .............. 366/101, 366/103, 104, 105, 106, 107, 142, 143, 151.1; 210/85, 90, 149; 222/3, 195, 261; 261/96, 261/121.4; 137/3, 4, 5

See application file for complete search history.

(56) References Cited

U.S. PATENT DOCUMENTS

| | | | | |
|---|---|---|---|---|
| 3,159,383 A | * | 12/1964 | Van Munster | 366/107 |
| 3,671,018 A | * | 6/1972 | McKibben et al. | 366/107 |
| 4,136,970 A | * | 1/1979 | Cabrera et al. | 366/101 |
| 4,595,296 A | | 6/1986 | Parks | |
| 5,298,164 A | | 3/1994 | Hapach et al. | |
| 5,538,162 A | * | 7/1996 | Reh et al. | 222/63 |
| 5,592,868 A | * | 1/1997 | Asai et al. | 99/348 |
| 6,280,636 B1 | | 8/2001 | Locklair | |
| 6,372,140 B2 | | 4/2002 | Kelly | |
| 6,435,209 B1 | | 8/2002 | Heil | |
| 6,629,773 B2 | | 10/2003 | Parks | |
| 6,896,804 B2 | | 5/2005 | Haerther et al. | |
| 7,005,068 B2 | | 2/2006 | Hoffland | |
| 7,282,141 B2 | | 10/2007 | Koopmans et al. | |
| 7,374,675 B2 | | 5/2008 | Koopmans et al. | |
| 2002/0154567 A1 | * | 10/2002 | Husher | 366/132 |
| 2006/0070948 A1 | | 4/2006 | Wickham | |
| 2006/0081534 A1 | | 4/2006 | Dimitriou et al. | |
| 2006/0086662 A1 | | 4/2006 | Ogden | |
| 2006/0096918 A1 | | 5/2006 | Semmens | |
| 2006/0124543 A1 | | 6/2006 | Pehrson et al. | |
| 2006/0254977 A1 | | 11/2006 | Koopmans et al. | |
| 2008/0270162 A1 | * | 10/2008 | Machacek | 705/1 |
| 2009/0207689 A1 | * | 8/2009 | Artusi | 366/140 |

FOREIGN PATENT DOCUMENTS

JP  07-203806  8/1995

* cited by examiner

*Primary Examiner* — Yogendra Gupta
*Assistant Examiner* — Emmanuel S Luk
(74) *Attorney, Agent, or Firm* — Anthony Claiborne

(57) ABSTRACT

A process and system mixes drinking water stored in large water tower type storage tanks, preventing stratification of the water, by generating large mixing bubbles in the tank's standpipe, causing mixing of layers of water in the tank through turbulence created as the bubbles rise through the tank. Embodiments of the present invention, adapted for use in storage tanks in which the standpipe serves as both water inlet and outlet, detect flow in the standpipe and provide mixing only when the standpipe is not serving as a water outlet.

9 Claims, 3 Drawing Sheets

WATER SUPPLY MIXING PROCESS

CROSS REFERENCE TO RELATED APPLICATION

This application claims priority from U.S. provisional application No. 61/127,376, filed May 12, 2008, entitled WATER SUPPLY MIXING PROCESS.

BACKGROUND

1. Field of the Invention

This invention relates to methods for ensuring purity of potable water supplies. More specifically, this invention relates to methods for avoiding stagnation of such water supplies in storage tanks.

2. Description of the Related Art

Stagnant water is a leading cause of the deterioration of drinking water stored in water storage tanks. When a large capacity tank is underutilized, differential thermal conditions in the tank can cause the contents to stratify in thermoclines, where warmer layers of water meet cooler layers. As is well known in the art, the accumulation and growth of algae, protozoan pathogens such as *cryptosporidium* and other undesirable organisms is favored at such thermoclines.

If, as is often the case, a tank with stratified contents is both filled and emptied from a limited portion of the tank, water supplied by the tank will be from recently filled, fresher strata, while the remaining strata in the tank may age and harbor increasing microbial populations, becoming stagnant.

In many public water systems, water is disinfected before it enters the storage tank to ensure that potentially dangerous microbes are killed before the water enters the distribution system. Because residual disinfectant remains in the water after treatment, disinfectant agents such as chlorine, chloramines or chlorine dioxide provide further protection from microbial reproduction after water enters the distribution system. The efficacy of such residual disinfectants diminishes with time, however. When disinfected water is allowed to stratify in storage tanks, older layers of water may lose disinfectant protection altogether, leading to the possibility that such portions of the tank become stagnant despite disinfectant treatment of water prior to transport to the tank.

What is needed is a method of preventing or remediating stratification of water in storage tanks. As will be understood by those in the art, stratification can be obviated by sufficient vertical mixing of water in the tank.

A number of means for mixing liquids are available to de-stratify stored water. A mechanical mixer, comprised of a screw or blade that is turned by a motor, is commonly employed to mix various liquids. Mechanical mixers, however, are subject to a number of shortcomings for mixing drinking water in storage tanks.

Mixing the strata in a typical large water storage tank with a mechanical mixer requires a large amount of energy relative to the amount of water that is actually mixed. Further, agitation of the water in the tank by mechanical mixers can disturb sediment settled in the bottom of the tank, resulting in suspended sediment degrading the aesthetics of the water for drinking. Further still, mechanical mixers are often inefficient, mixing some but not all strata in a storage tank. In addition, acquisition costs can be high for a mechanical mixer having sufficient capacity to mix all the strata in a large storage tank. Yet further, costs are high to retrofit an existing water storage tank with a mechanical mixer, retrofitting further often entailing a need to drain the tank or otherwise temporarily remove the tank from the water distribution system. What is needed are more economical and efficient means of mixing water to eliminate stratification with minimal disturbance to sediment in the tank. What is needed further is such means that can be retrofitted to a water storage tank operation economically and without a need to take the water tank off-line.

For economy, it is further desirable that the mixer that is used to obviate stratification be engaged only when needed, i.e. only when stratification is taking place. Accordingly, it is desirable to have a means for determining when mixing is needed and for engaging the mixer only at such times.

It is further desirable that the mixer system be easy to install and easy to operate.

BRIEF SUMMARY OF THE INVENTION

The present invention provides a means for mixing drinking water stored in large water tower type storage tanks, preventing stratification of the water, by generating large mixing bubbles in the tank's standpipe, causing mixing of layers of water in the tank through turbulence created as the bubbles rise through the tank. Embodiments of the present invention, adapted for use in storage tanks in which the standpipe serves as both water inlet and outlet, detect flow in the standpipe and provide mixing only when the standpipe is not serving as a water outlet.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

Figure 1:
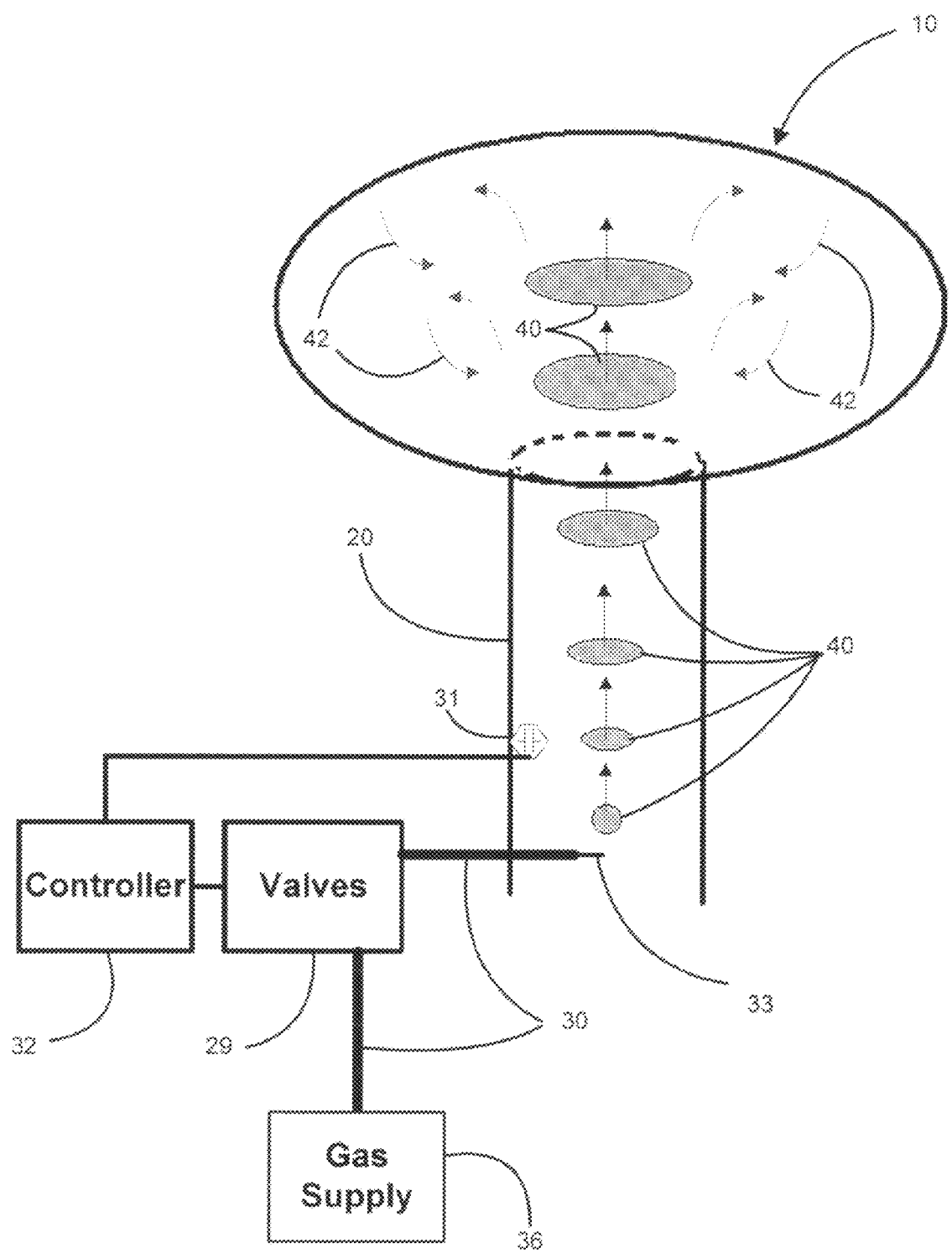
FIG. 1 is a diagram of an embodiment of the present invention in a water tower type storage tank.

FIG. 1 illustrates an embodiment of the present invention. In this embodiment for elevated oblate spheroid water tank 10, gas supply 36 makes available a supply of pressurized gas to supply line 30, interposed in which are valves 29 under control of controller 32. In response to signaling from controller 32, valves 29 open to allow the passage of pressurized gas through supply line 30, which disperses the gas through orifice 33 into the lower portion of tank inlet standpipe 20. Controller 32 opens valves 29 at such a rate and with such a volume of gas as to generate large mixing bubbles 40 that cause mixing of the water in tank 10 to prevent or remove thermoclines. Controller 32 may open valves 29 in response to data from sensors (not depicted) that indicate a thermocline is forming or has formed. Such sensors may be thermistors indicating temperature differences in different portions of the tank corresponding to the formation of thermoclines. Alternatively, sensors may be used to detect a parameter other than temperature that indicates the formation of a thermocline and/or stagnation of water in portions of tank 10. Such parameters may include levels of free chlorine, oxygen, nitrates, biological oxygen demand, and other parameters known to those of skill in the art, whose differential values at different levels in the tank indicate that water stratification is taking place. In yet other embodiments, no such sensors are used: rather, controller 32 opens valves 29 according to a program schedule designed to provide large bubbles for sufficient mixing sufficiently frequently to reduce the incidence of thermoclines in the tank.

In any case, because of the high pressure of the head of water over the lower portion of standpipe 20, bubbles 40 emitted at orifice 33 are initially small and spherical. However, as they rise through standpipe 20 to enter tank 10, the pressure diminishes with diminishing head of water and bubbles 40 therefore become larger, assuming an oblate shape as they travel upward. By the time bubbles 40 enter tank 10, they have become large, on the order of 0.5 to 3 or more meters in diameter along the largest dimension, providing mixing currents as indicated by arrows 42.

For some tanks 10, standpipe 20 serves as both an inlet and an outlet pipe. Preferred operation of the present invention takes place when there is no net outflow in standpipe 20. Accordingly, for such tanks with two-way flow in the standpipe, it is preferred to add a sensor 31 for water flow in standpipe 20 so that controller 32 opens valves 29 to provide pressurized gas to tank 10 only when there is no net outflow from the tank in standpipe 20, as illustrated in the flow chart provided in FIG. 3 discussed below.

Figure 2:
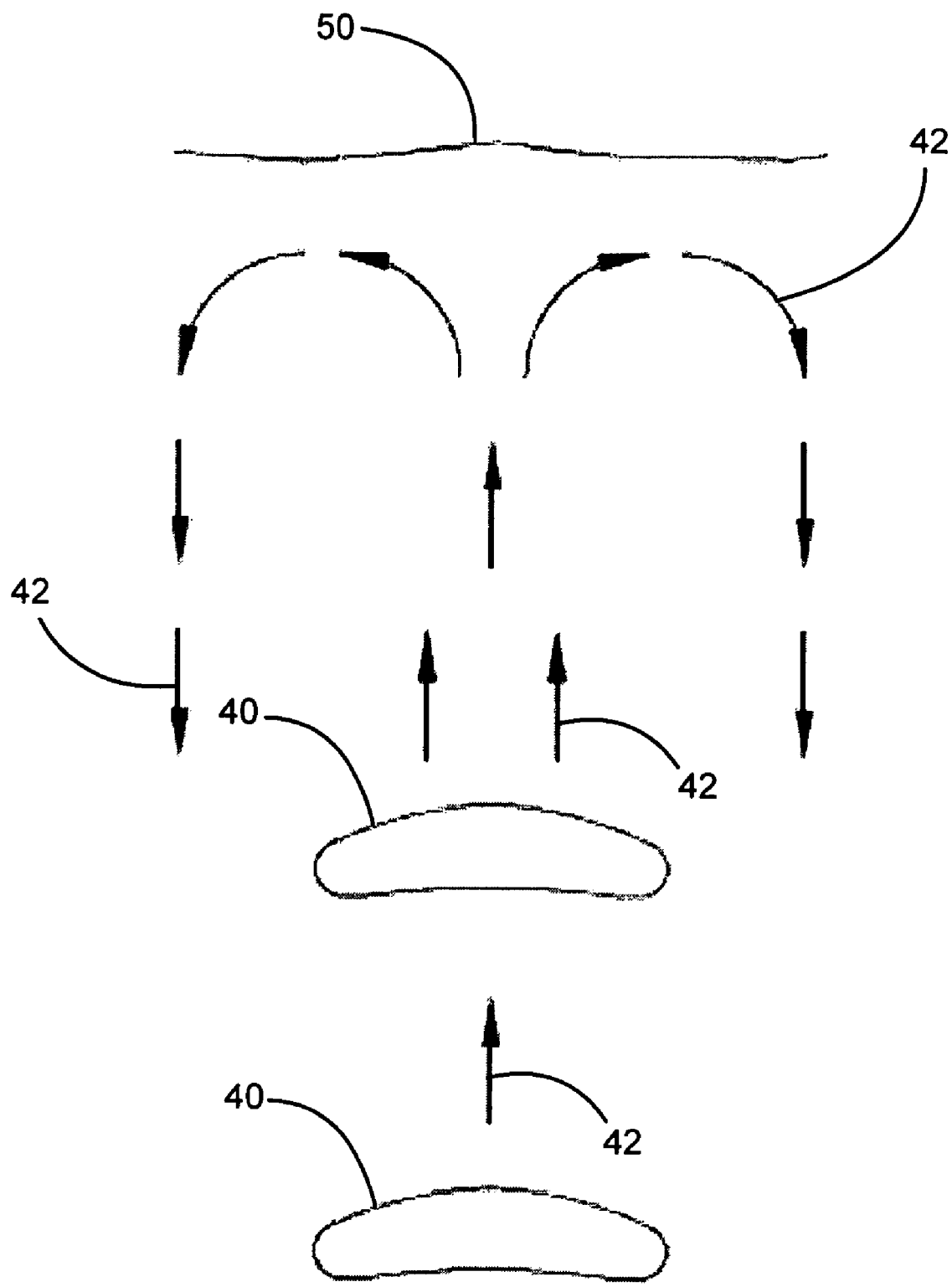
FIG. 2 is a diagram illustrating mixing of drinking water in a storage tank by turbulence caused by rising bubbles according to an embodiment of the invention such as illustrated in FIG. 1.

FIG. 2 is an illustration providing more detail of the mixing effects of large bubbles 40 in tank 10. The mixing bubbles 40 generate the mixing currents indicated by the arrows 42 (12 arrows shown but only four labeled with the reference number 42 for clarity) that mix the water 50. The strength of the mixing currents 42 depends on the speed at which each mixing bubble 40 travels through the water and the size of each bubble 40.

The speed of the mixing bubble 40 depends on the density of the gas employed in the invention relative to the density of water 50, and the bubble's shape. The greater the difference between the densities of water 50 and the gas, the faster the mixing bubbles 40 rise through water 50. The more aerodynamic the shape of the bubble 40 becomes the faster the bubble 40 rises through water 50. For example, in one embodiment, the bubble 40 forms an oblate spheroid—a sphere whose dimension in the vertical direction is less than the dimension in the horizontal direction. In other embodiments, the bubble 40 forms a squished sphere having the trailing surface—the surface of the bubble 40 that is the rear of the bubble 40 relative to the direction in which bubble 40 moves—that is convex when viewed from the direction that the bubble 40 moves.

The size of the mixing bubble 40 depends on the flow rate of the gas into water 50. The flow rate depends on the size of the orifice 33 and the gas's injection pressure. Typical orifices 33 may vary from about ½ inch for small tanks to 1½ inches for very large tanks. Injection pressures may vary from about 40 to about 100 or more pounds per square inch for larger tanks and taller heads of water. As one increases the gas injection pressure, one increases the amount of gas injected into water 50 over a specific period of time that the valve 29 is open. And, as one increases the area of the orifice 33, one increases the amount of gas injected into water 50 over a given period of time that the valve 29 is open. The size of bubble 40 can be varied by varying the volume of gas injected into water 50 and the period of time taken to inject a given quantity or pulse of gas. Controller 32 creates a pulse of gas by causing valve 29 to open for a short period of time. Depending upon the embodiment, this pulse may last from 0.3 to 0.6 seconds. In one embodiment in which a relatively small pulse of gas is injected over a moderately long period of time, the size of bubbles 40 is approximately 0.5 meters across the largest dimension. In other embodiments in which a large quantity of highly pressurized gas is injected quickly through a larger orifice, the bubbles 40 are approximately 3 meters or greater across in largest dimension at the top of the tank.

Figure 3:
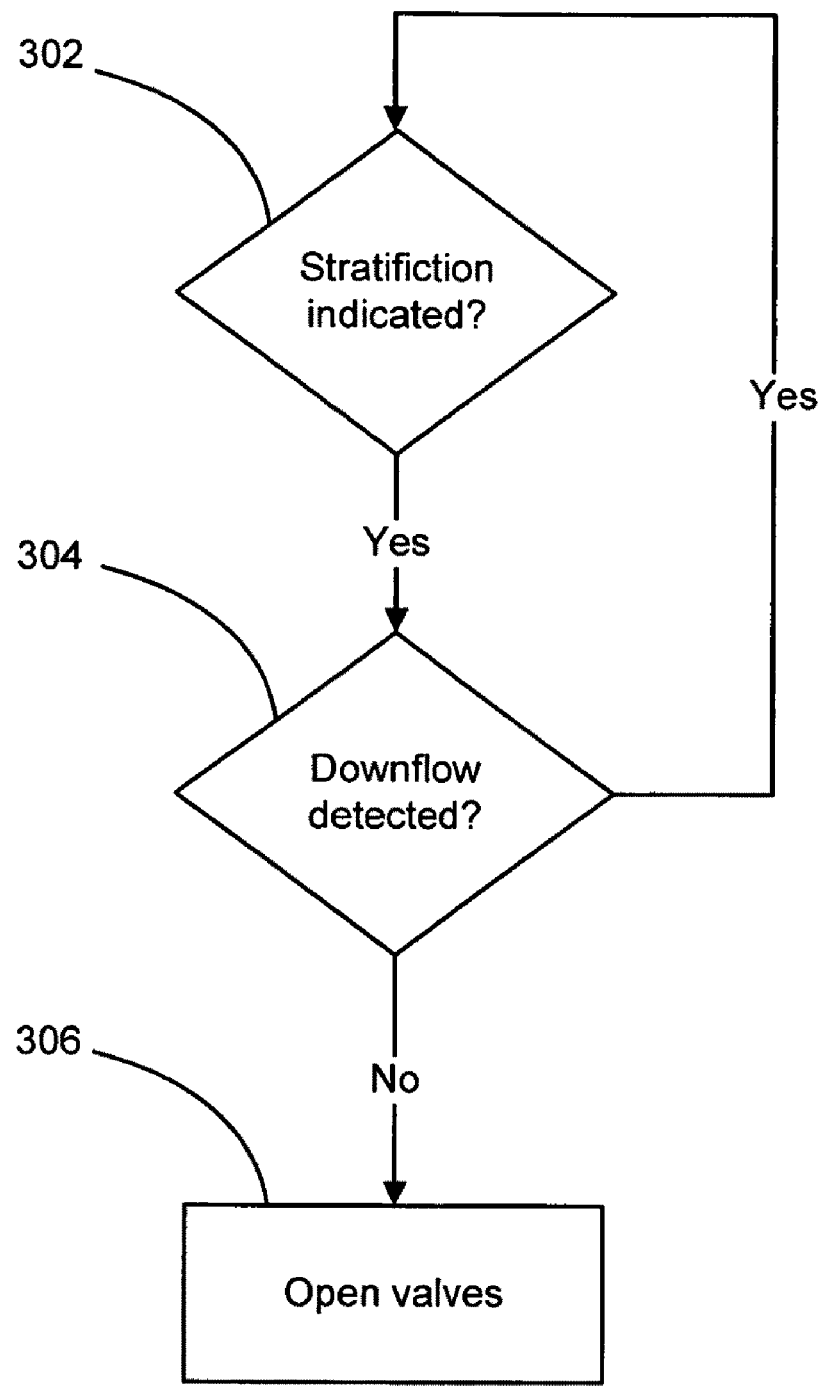
FIG. 3 is a flow chart for operation of an embodiment of the invention.

Turning to FIG. 3, depicted is a simple flowchart for operation of embodiments of the invention when the standpipe 20 serves as both an inlet and an outlet for tank 10. As discussed above, in some embodiments of the invention, stratification of water is indicated by the presence of thermoclines or other indicators of stratification in tank 10 as detected by sensors in the tank. In other embodiments of the invention, it is assumed that stratification develops in tank 10 over time, such stratification indicated simply by the passage of time since the water 50 in tank 10 was last mixed by the release of large mixing bubbles 42 by the invention. In any case, when a stratification condition is indicated 302, controller 32 detects 304 whether there is outflow in standpipe 20 based upon data supplied by sensor 31. Only if no outflow is detected 304 in standpipe 20 will controller 32 direct valves 29 to open 306, thereby releasing gas into standpipe 20 to form large mixing bubbles 42

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above. While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. A process for mixing a supply of water in a storage tank having a standpipe in which water may flow into and out of the tank, the process comprising:
   determining whether water has stratified in the tank;
   determining whether water is flowing out of the tank in the standpipe; and,
   responsive to the determination that water has stratified in the tank and that water is not flowing out of the tank in the standpipe, and releasing a quantity of compressed gas to form at least one large mixing bubble to rise through the water in the tank,
   whereby the rising of the at least one large mixing bubble generates currents in the water to mix and destratify the water supply.

2. A system to mix a supply of water in a storage tank having a standpipe in which water may flow into and out of the tank, the system comprising:
   a sensor for water flow in the standpipe, the sensor providing a signal indicating whether water is flowing out of the tank in the standpipe;
   a means for determining whether the water supply in the tank should be mixed;
   a source of pressurized gas;

at least one valve connected to the source of pressurized gas, the valve controllably openable to provide pressurized gas in the standpipe to form at least one large mixing bubble; and a controller that opens the at least one valve only when it is determined that the water supply should be mixed and the sensor indicates that water is not flowing out of the tank in the standpipe.

3. A system according to claim 2, wherein the means for determining whether the water supply should be mixed comprises:

a clock coupled to the controller, wherein the controller is programmable and has a pre-programmed schedule of times for mixing, the controller further programmed to determine that the water supply should be mixed when the clock indicates a time corresponding to a time pre-programmed in the schedule.

4. A system according to claim 2, wherein the means for determining whether the water supply should be mixed comprises:

a timer coupled to the controller, the timer providing the duration of time since the water supply was last mixed, and the controller is configured to determine that the water supply should be mixed when the duration of time since the water supply was last mixed exceeds a preset value.

5. A system according to claim 2, wherein the means for determining whether the water supply should be mixed comprises:

at least one sensor providing measurement data of at least one parameter related to stratification, the sensor coupled to the controller, the controller further configured to determine that the water supply should be mixed when the measurement data corresponds to a preset value.

6. A system according to claim 5, wherein the at least one sensor provides measurement data indicating concentration of at least one of free chlorine, oxygen, nitrates and biological oxygen demand in the water supply.

7. A system according to claim 2, wherein the means for determining whether the water supply should be mixed comprises:

a plurality of sensors at different locations in the tank, each sensor providing measurement data to the controller of at least one parameter proximate the sensor related to stratification, the controller further configured to determine that the water supply should be mixed when the difference in measurement data between sensors corresponds to a preset value indicating stratification has occurred.

8. A system according to claim 7, wherein each sensor provides measurement data indicating concentration of at least one of free chlorine, oxygen, nitrates and biological oxygen demand in the water supply.

9. A system according to claim 7, wherein each sensor provides measurement data to the controller indicating the temperature of the water proximate the sensor.

* * * * *